(12) United States Patent
Ochiai et al.

(10) Patent No.: US 9,607,751 B2
(45) Date of Patent: Mar. 28, 2017

(54) FERRITE SINTERED BODY, FERRITE CORE, AND COIL COMPONENT

(71) Applicant: KYOCERA Corporation, Kyoto-shi, Kyoto (JP)

(72) Inventors: Hitomi Ochiai, Higashiomi (JP); Kenichi Furutachi, Kirishima (JP); Hidehiro Takenoshita, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 100 days.

(21) Appl. No.: 14/422,121

(22) PCT Filed: Aug. 2, 2013

(86) PCT No.: PCT/JP2013/071011
§ 371 (c)(1),
(2) Date: Feb. 17, 2015

(87) PCT Pub. No.: WO2015/015636
PCT Pub. Date: Feb. 5, 2015

(65) Prior Publication Data
US 2015/0228395 A1    Aug. 13, 2015

(51) Int. Cl.
```
C04B 35/30    (2006.01)
H01F 1/34     (2006.01)
H01F 27/255   (2006.01)
C04B 35/26    (2006.01)
H01F 17/04    (2006.01)
C01G 53/00    (2006.01)
H01F 1/01     (2006.01)
H01F 27/28    (2006.01)
H01F 3/08     (2006.01)
```

(52) U.S. Cl.
CPC ......... *H01F 27/255* (2013.01); *C01G 53/006* (2013.01); *C01G 53/40* (2013.01); *C04B 35/26* (2013.01); *H01F 1/01* (2013.01); *H01F 1/344* (2013.01); *H01F 3/08* (2013.01); *H01F 17/045* (2013.01); *H01F 27/2823* (2013.01); *C01P 2002/50* (2013.01); *C01P 2006/40* (2013.01); *C01P 2006/42* (2013.01); *C04B 2235/3208* (2013.01); *C04B 2235/3232* (2013.01); *C04B 2235/3244* (2013.01); *C04B 2235/3256* (2013.01); *C04B 2235/3258* (2013.01); *C04B 2235/3267* (2013.01); *C04B 2235/3279* (2013.01); *C04B 2235/3281* (2013.01); *C04B 2235/3284* (2013.01); *C04B 2235/3418* (2013.01); *C04B 2235/5436* (2013.01); *C04B 2235/5445* (2013.01); *C04B 2235/85* (2013.01)

(58) Field of Classification Search
CPC .............................. C04B 35/265; H01F 1/344
See application file for complete search history.

(56) References Cited

U.S. PATENT DOCUMENTS

2013/0126264 A1\* 5/2013 Takenoshita ............ H01F 1/344
                                                    181/175

FOREIGN PATENT DOCUMENTS

| JP | 2002-141215 A | 5/2002 |
| JP | 2002-321971 A | 11/2002 |
| JP | 2004-269316 A | 9/2004 |
| JP | 2011-246343 A | 12/2011 |
| JP | 2013-010685 A | 1/2013 |

OTHER PUBLICATIONS

International Search Report (Form PCT/ISA/210) dated Oct. 29, 2013 issued for PCT/JP2013/071011.

\* cited by examiner

*Primary Examiner* — Carol M Koslow
(74) *Attorney, Agent, or Firm* — Procopia Cory Hargreaves and Savitch LLP

(57) ABSTRACT

A ferrite sintered body includes a crystal grain of a Ni—Zn ferrite and a grain boundary thereof, in which Ti is unevenly distributed in an outer region of the crystal grain, the outer region extending from an interface of the crystal grain to a length of 20% of a major axis of the crystal grain.

9 Claims, 1 Drawing Sheet

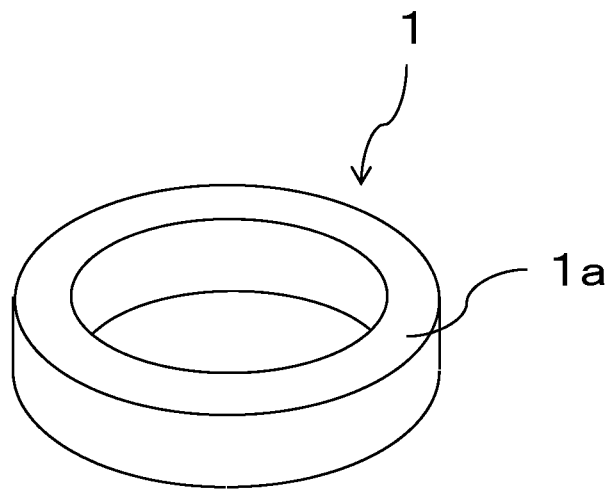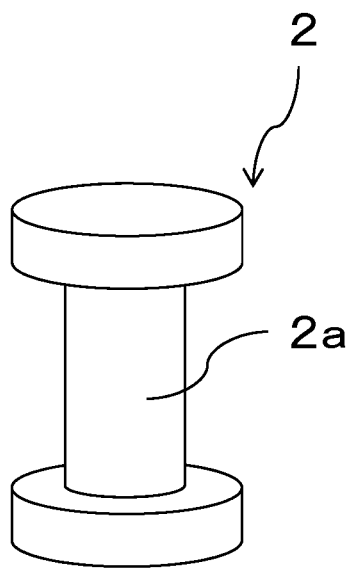

FERRITE SINTERED BODY, FERRITE CORE, AND COIL COMPONENT

TECHNICAL FIELD

The present invention relates to a ferrite sintered body, a ferrite core formed of the ferrite sintered body, and a coil component produced by winding a metal wire around the ferrite core.

BACKGROUND ART

Ferrite sintered bodies composed of Ni—Zn ferrite materials having high resistivity are widely used as cores of inductors, transformers, ballasts, electromagnets, etc.

In particular, recently, with the advent of vehicles having complex control systems, such as electric cars and hybrid cars, electric circuits installed in control devices and the like mounted in such vehicles have become complex. Accordingly, with the increased complexity of electric circuits, in order to prevent noise generated from the electric circuits from increasing and adversely affecting electronic components on the circuits, a large number of coil components each produced by winding a metal wire around a ferrite sintered body composed of a Ni—Zn ferrite material are used in the electric circuits for removing noise.

As an example of a Ni—Zn ferrite material used in a core for such applications, PTL 1 proposes a Ni—Zn ferrite including a main component containing 48% to 50% by mole of Fe in terms of $Fe_2O_3$, 15% or more and less than 30% by mole of Zn in terms of ZnO, 7% to 35% by mole of Ni in terms of NiO, and 2% to 7% by mole of Cu in terms of CuO, and 0.16 to 1.0 part by weight of Ti in terms of $TiO_2$ relative to 100 parts by weight of the main component.

PTL 2 proposes a Ni ferrite having a main composition of 49.0% to 50.0% by mole of $Fe_2O_3$, 10.0% to 15.0% by mole of NiO, 5.0% to 8.0% by mole of CuO, and the balance being ZnO, in which the Ni—Zn ferrite includes a subcomponent containing 0.1% by weight or less (excluding 0) of Ti in terms of $TiO_2$.

CITATION LIST

Patent Literature

PTL 1: Japanese Unexamined Patent Application Publication No. 2004-269316
PTL 2: Japanese Unexamined Patent Application Publication No. 2002-321971

SUMMARY OF INVENTION

Technical Problem

The Ni—Zn ferrite proposed in PTL 1 and PTL 2 can decrease core loss at high temperatures as a result of the incorporation of Ti. However, recently, Ni—Zn ferrite is required to have a high permeability, and in particular, Ni—Zn ferrite functioning as a core of a noise filter is required to have a high permeability in addition to a high resistivity.

The present invention has been made in order to satisfy the above requirements. An object of the present invention is to provide a ferrite sintered body and a ferrite core that have a high permeability. Another object of the present invention is to provide a coil component produced by winding a metal wire around a ferrite core formed of a ferrite sintered body having a high resistivity and a high permeability.

Solution to Problem

A ferrite sintered body of the present invention includes a crystal grain of a Ni—Zn ferrite and a grain boundary thereof, in which Ti is unevenly distributed in an outer region of the crystal grain, the outer region extending from an interface of the crystal grain to a length of 20% of a major axis of the crystal grain.

A ferrite core of the present invention includes the above ferrite sintered body.

A coil component of the present invention is produced by winding a metal wire around the above ferrite core.

A noise filter of the present invention includes the above coil component.

Advantageous Effects of Invention

According to the ferrite sintered body of the present invention, Ti is unevenly distributed in an outer region extending from an interface of a crystal grain of a Ni—Zn ferrite to a length of 20% of a major axis of the crystal grain. Accordingly, a ferrite sintered body having a high permeability can be provided.

In addition, the ferrite core of the present invention is formed of a ferrite sintered body having a high permeability. Accordingly, a ferrite core having good characteristics can be provided.

Furthermore, the coil component of the present invention is produced by winding a metal wire around a ferrite core formed of a ferrite sintered body having a high resistivity and a high permeability. Accordingly, when the coil component is used as a noise filter, a good noise removing performance can be achieved.

BRIEF DESCRIPTION OF DRAWINGS

FIG. 1(a) is a perspective view of a toroidal core and FIG. 1(b) is a perspective view of a bobbin core, the toroidal core and the bobbin core showing examples of a ferrite sintered body of the present embodiment.

DESCRIPTION OF EMBODIMENTS

A ferrite sintered body of the present invention, a ferrite core of the present invention, and a coil component of the present invention produced by winding a metal wire around a ferrite core will now be described. A ferrite sintered body of the present embodiment is used in, for example, an inductor, a transformer, a ballast, or an electromagnet for insulation or voltage transformation or in a noise filter for noise removal or the like in the form of a ferrite core (hereinafter may be simply referred to as "core") formed of the ferrite sintered body alone or as a coil component produced by winding a metal wire around the ferrite core.

The ferrite sintered body functioning as a core may have various shapes. Examples thereof include a ring-shaped toroidal core 1 shown in the perspective view of FIG. 1(a) and a bobbin-shaped bobbin core 2 shown in the perspective view of FIG. 1(b).

This ferrite sintered body is required to have a high permeability. A ferrite sintered body that satisfies this requirement is preferably a ferrite sintered body including crystal grains of a Ni—Zn ferrite and grain boundaries thereof, in which Ti is unevenly distributed in an outer region of a crystal grain, the outer region extending from an interface of the crystal grain to a length of 20% of a major axis of the crystal grain.

Herein, the Ni—Zn ferrite includes an oxide of Fe, an oxide of Zn, and an oxide of Ni or an oxide of Fe, an oxide of Zn, an oxide of Ni, and an oxide of Cu. The "outer region extending from an interface of a crystal grain composed of a Ni—Zn ferrite to a length of 20% of a major axis of the crystal grain" refers to a portion extending from an interface of one crystal grain composed of a Ni—Zn ferrite to a length of 20% of a major axis in the one crystal grain composed of the Ni—Zn ferrite and selected from a cross section of a ferrite sintered body. The "major axis" refers to the length in the longest direction of a target grain (crystal grain composed of a Ni—Zn ferrite), as described in JIS R 1670-2006. The "length of 20% of a major axis" refers to a value calculated by multiplying the length of the major axis by 0.2.

The "one crystal grain composed of a Ni—Zn ferrite and selected from a cross section of a ferrite sintered body" refers to a crystal grain having a size in the range of $D_{40}$ to $D_{60}$ when an average crystal grain diameter calculated in the cross section of the ferrite sintered body is represented by $D_{50}$. This is based on the following assumption. In the ferrite sintered body of the present embodiment, the state of the presence of Ti in a crystal grain composed of a Ni—Zn ferrite is specified. On the other hand, a cross section of the ferrite sintered body includes individual crystal grains that are partially cut. Accordingly, by selecting a crystal grain having a size in the range of $D_{40}$ to $D_{60}$, a crystal grain whose central portion is assumed to be cut is used as a target crystal grain.

In the present embodiment, the term "uneven distribution" means that when an outer region and an inner region other than the outer region are viewed in a crystal grain, the amount of Ti present in the outer region is larger than that in the inner region. Also in the case where the inner region does not contain Ti, titanium is considered to be unevenly distributed.

The inventors of the present invention found that the position of Ti present in a crystal grain affects the permeability, though the reason why the ferrite sintered body of the present embodiment has a high permeability is not clear.

The permeability of a sample may be measured using an LCR meter at a frequency of 100 kHz. The sample may be prepared by, for example, winding a covered conducting wire having a wire diameter of 0.2 mm ten times over the entire circumference of a winding portion 1a of a ring-shaped toroidal core 1 shown in FIG. 1(a), the toroidal core 1 being composed of a ferrite sintered body and having an outer diameter of 13 mm, an inner diameter of 7 mm, and a thickness of 3 mm.

Whether or not Ti is unevenly distributed in a crystal grain composed of a Ni—Zn ferrite may be determined as follows. On a surface of a ferrite sintered body subjected to a process such as polishing, a crystal grain having a crystal grain diameter of $D_{40}$ to $D_{60}$ is selected. Mapping of characteristic X-ray intensity of Ti is then performed by using a wavelength-dispersive X-ray microanalyzer (EPMA). The number of counts of the characteristic X-ray intensity of Ti in the inner region of the crystal grain is compared with the number of counts of the characteristic X-ray intensity in the outer region.

Alternatively, preferably, a sample is observed with a transmission electron microscope (TEM), and a spot (diameter ϕ: 1 nm) is directed on the inner region and the outer region of a crystal grain by using an energy-dispersive X-ray spectrometer (EDS) attached to the TEM. In this case, the amount (mass ratio) of Ti when the mass in the spot having a diameter ϕ of 1 nm is assumed to be 100% by mass may be compared between the inner region and the outer region. Specifically, the amount of Ti is determined at three positions in each of the inner region and the outer region. The average of the amount of Ti present in the inner region and the average of the amount of Ti present in the outer region are then determined, and compared. In this measurement, not only the amount of Ti but also, for example, the amounts of Fe, Zn, Ni, Cu, Ti, and 0 when the mass in the spot having a diameter ϕ of 1 nm is assumed to be 100% by mass can be determined.

The ferrite sintered body of the present embodiment preferably contains Fe, Zn, Ni, Cu, and Ti. When the total of components of Fe, Zn, Ni, and Cu in terms of oxides thereof is assumed to be 100% by mole, a composition of the ferrite sintered body of the present embodiment is preferably 48% by mole or more and 50% by mole or less of Fe in terms of $Fe_2O_3$, 29% by mole or more and 31% by mole or less of Zn in terms of ZnO, 14% by mole or more and 16% by mole or less of Ni in terms of NiO, and 5% by mole or more and 7% by mole or less of Cu in terms of CuO. In addition, the ferrite sintered body of the present embodiment preferably contains 0.05% by mass or more and 0.30% by mass or less of Ti in terms of $TiO_2$ relative to total 100% by mass of the components.

When the components contained in the ferrite sintered body satisfy the above composition and the ferrite sintered body contains Ti in the above content, a ferrite sintered body having a high resistivity and a high permeability can be obtained. The components contained in the ferrite sintered body preferably account for 98% by mass or more when all components constituting the ferrite sintered body is assumed to be 100% by mass.

The resistivity may be measured by using, for example, a flat plate-shaped sample having a diameter ϕ of 10 to 20 mm and a thickness of 0.5 to 2 mm with a super megohmmeter (manufactured by TOA Corporation, DSM-8103) in a measurement environment at an application voltage of 1,000 V, at a temperature of 26° C., and at a humidity of 36% by a three-terminal method (JIS K6271; double ring electrode method).

The composition of the above components may be calculated by the following method. The contents of Fe, Zn, Ni, and Cu are determined by using an inductively coupled plasma (ICP) emission spectrophotometer or an X-ray fluorescence spectrometer, and the contents of Fe, Zn, Ni, and Cu are respectively converted to the contents of $Fe_2O_2$, ZnO, NiO, and CuO. The molar values are then calculated from the corresponding molecular weights. The ratio of each component relative to total 100% by mole is calculated. The content of Ti may be determined as follows. The content of Ti is determined by using an ICP emission spectrophotometer or an X-ray fluorescence spectrometer, and the content of Ti is then converted to the content of $TiO_2$. The ratio of $TiO_2$ relative to 100% by mass of the above components is then calculated.

In the ferrite sintered body of the present embodiment, an amount of Ti present in the outer region is preferably 0.5% by mass or more and 5% by mass or less. When the amount of Ti is within the above range, a ferrite sintered body having a higher permeability can be obtained.

Note that the amount of Ti present in the outer region is the amount determined by the above-described measurement using a TEM. The amount of Ti present in the outer region is not the content in all components constituting the ferrite sintered body or the content relative to 100% by mass of components constituting a crystal grain composed of a Ni—Zn ferrite. For example, when the Ti content relative to 100% by mass of components constituting a crystal grain composed of a Ni—Zn ferrite is 0.2% by mass in terms of $TiO_2$, the content is 0.12% by mass in terms of Ti. However, in the measurement by TEM, Ti may be present in an amount of more than 0.12% by mass in the outer region of the crystal grain composed of the Ni—Zn ferrite because Ti is unevenly distributed.

In the ferrite sintered body of the present embodiment, a portion having a characteristic X-ray intensity of Ni higher than that in a crystal grain of the Ni—Zn ferrite is preferably present in a grain boundary of the crystal grain of the Ni—Zn ferrite, and the area occupancy ratio of the portion is preferably 0.01% or more and 2.0% or less. When this configuration is satisfied, a ferrite sintered body having a good hardness can be obtained, though the reason for this is not clear.

The portion having a higher characteristic X-ray intensity of Ni refers to the following portion. When a cross section of a mirror-finished ferrite sintered body is measured by EPMA, mapping of characteristic X-ray intensity of Ni is performed in a field of view, for example, an area of 4,900 $\mu m^2$ of 70 $\mu m \times 70$ $\mu m$. In this mapping, a portion that shows the number of counts as being not less than 20% higher than the number of counts of characteristic X-ray intensity of Ni in a crystal grain of the Ni—Zn ferrite is referred to as a portion having a higher characteristic X-ray intensity of Ni. The area occupancy ratio refers to a value determined by dividing the area of the portion showing the number of counts as being not less than 20% higher than the number of counts of characteristic X-ray intensity of Ni in a crystal grain of the Ni—Zn ferrite by 4,900 $\mu m^2$ which is the area of the field of view, and expressing the result as a percentage.

The ferrite sintered body of the resent embodiment preferably contains Mn, and a Mn content is preferably 0.05% by mass or more and 0.5% by mass or less in terms of $MnO_2$ relative to total 100% by mass of the above components. When this configuration is satisfied, a ferrite sintered body having a higher permeability can be obtained. The reason for this is believed to be as follows. Since Mn can take a plurality of valences, during firing, oxygen deficiency of crystal grains of the Ni—Zn ferrite is compensated by excess oxygen due to a change in the valence. Consequently, oxygen deficiency of crystal grains of the Ni—Zn ferrite is reduced.

The ferrite sintered body of the resent embodiment preferably contains at least one of Mo and W, and a Mo content and a W content are preferably respectively 0.01% by mass or more and 0.15% by mass or less in terms of $MoO_3$ and 0.01% by mass or more and 0.15% by mass or less in terms of $WO_3$ relative to total 100% by mass of the above components. When this configuration is satisfied, a ferrite sintered body having a higher permeability can be obtained. It is believed that these elements affect the length of the domain wall of crystal grains of the Ni—Zn ferrite, though the reason for this is not clear.

The contents in terms of $MnO_2$, $MoO_3$, and $WO_3$ may be determined as follows. The contents of Mn, Mo, and W are determined by using an ICP emission spectrophotometer or an X-ray fluorescence spectrometer, and the contents of Mn, Mo, and W are respectively converted to the contents of $MnO_2$, $MoO_3$, and $WO_3$. The values relative to 100% by mass of the above components may then be calculated.

Next, an example of a method for producing a ferrite sintered body of the present embodiment will be described in detail. In a method for producing a ferrite material of the present embodiment, in order to produce a Ni—Zn ferrite, first, oxides of Fe, Zn, and Ni or metal salts such as carbonates and/or nitrates that produce oxides of Fe, Zn, and Ni by firing are prepared as starting materials. For example, when Fe is prepared in the form of an iron oxide ($Fe_2O_3$), Zn is prepared in the form of zinc oxide (ZnO), and Ni is prepared in the form of nickel oxide (NiO), the average particle diameters of these starting materials are each preferably 0.5 $\mu m$ or more and 5 $\mu m$ or less. In the case where the ferrite material is a Ni—Zn ferrite containing an oxide of Cu, an oxide of Cu or a metal salt such as a carbonate or a nitrate that produces an oxide of Cu by firing is prepared. For example, when Cu is prepared in the form of copper oxide (CuO), the average particle diameter of this starting material is preferably 0.5 $\mu m$ or more and 5 $\mu m$ or less.

In the method for producing a ferrite sintered body of the present embodiment, silicon oxide ($SiO_2$) having an average particle diameter of 0.5 to 10 $\mu m$ is added to the starting materials. The starting materials and silicon oxide are each weighed to have a predetermined amount, and are pulverized and mixed using a ball mill, a vibration mill, or the like. The resulting mixture is then calcined at a temperature of 600° C. or higher and 800° C. or lower for two hours or more to prepare a synthesized calcined body.

The starting materials are preferably weighed so that, for example, when the total of components of Fe, Zn, Ni, and Cu in terms of oxides thereof is assumed to be 100% by mole, the composition becomes 48% by mole or more and 50% by mole or less of Fe in terms of $Fe_2O_3$, 29% by mole or more and 31% by mole or less of Zn in terms of ZnO, 14% by mole or more and 16% by mole or less of Ni in terms of NiO, and 5% by mole or more and 7% by mole or less of Cu in terms of CuO. Silicon oxide is preferably weighed so that the amount of silicon oxide is 0.3% by mass or less (excluding 0% by mass) relative to 100% by mass of the above components.

Next, an oxide of Ti or a metal salt such as a carbonate or a nitrate that produces an oxide of Ti by firing, the oxide or the metal salt having an average particle diameter in the range of 0.5 to 10 $\mu m$, is prepared, and a predetermined amount of the oxide or the metal salt is weighed. The weighing is preferably performed so that the amount of Ti becomes 0.05% by mass or more and 0.3% by mass or less in terms of $TiO_2$ relative to 100% by mass of the above components. The oxide or the metal salt is put in a ball mill, a vibration mill, or the like together with the calcined body and mixed. A predetermined amount of a binder is then added to the resulting mixture to prepare a slurry. The slurry is granulated by using a spray granulator (spray dryer) to prepare spherical granules.

By conducing calcination synthesis after the addition of silicon oxide to the starting materials, and adding Ti after the calcination synthesis in this manner, Ti can be unevenly distributed in outer regions of crystal grains of the Ni—Zn ferrite. Furthermore, the resistivity can also be increased by incorporating silicon oxide. In contrast, in the case where silicon oxide is not added to the starting materials, silicon oxide is added after calcination synthesis, or Ti is added to the starting materials, the effect of increasing the permeability, the effect being achieved by unevenly distributing Ti in outer regions of crystal grains of the Ni—Zn ferrite, cannot be obtained.

Next, press forming is performed using the spherical granules to prepare a compact having a predetermined shape. Subsequently, the compact is subjected to a binder-removing process in a degreasing furnace in the range of 400° C. to 800° C. to prepare a degreased body. The degreased body is fired in a firing furnace by being maintained at a maximum temperature of 1,000° C. to 1,200° C. for two to five hours. Thus, a ferrite sintered body of the present embodiment can be obtained.

In the ferrite sintered body of the present embodiment, in order to make the amount of Ti present in the outer region 0.5% by mass or more and 5% by mass or less, the temperature increasing rate in the range of 800° C. to 1,000° C. in the firing step is set to 150° C./h or more and 500° C./h or less.

In the ferrite sintered body of the present embodiment, in order to allow a portion having a characteristic X-ray intensity of Ni higher than that in a crystal grain of a Ni—Zn ferrite to be present in a grain boundary of the crystal grain of the Ni—Zn ferrite and to make the area occupancy ratio of the portion 0.01% or more and 2.0% or less, a Ni powder is weighed so that the amount of Ni becomes 0.001% by mole or more and 0.03% by mole or less in terms of NiO and is added after the calcination synthesis. The Ni powder added after the calcination synthesis preferably has an average particle diameter of 0.5 μm or more and 1 μm or less. In the case where a Ni powder is added after the calcination synthesis, in weighing the starting material, the amount of starting material from which the amount to be added after the calcination synthesis is subtracted is weighed.

In the ferrite sintered body of the present embodiment, in order to incorporate Mn in an amount of 0.05% by mass or more and 0.5% by mass or less in terms of $MnO_2$ relative to total 100% by mass of the above components, an oxide of Mn or a metal salt such as a carbonate or a nitrate that produces an oxide of Mn by firing is weighed so that the amount of Mn becomes 0.05% by mass or more and 0.5% by mass or less in terms of $MnO_2$ relative to total 100% by mass of the above components, and added after the calcination synthesis.

In the ferrite sintered body of the present embodiment, in order to incorporate at least one of Mo and W in an amount of 0.01% by mass or more and 0.15% by mass or less in terms of $MoO_3$ and in an amount of 0.01% by mass or more and 0.15% by mass or less in terms of $WO_3$ relative to total 100% by mass of the above components, at least one oxide of Mo and/or W or at least one metal salt such as a carbonate or a nitrate that produces an oxide of Mo and/or W by firing is weighed so that the amount of Mo becomes 0.01% by mass or more and 0.15% by mass or less in terms of $MoO_3$ and the amount of W becomes 0.01% by mass or more and 0.15% by mass or less in terms of $WO_3$ relative to total 100% by mass of the above components, and added after the calcination synthesis.

The ferrite sintered body of the present embodiment may contain CaO and $ZrO_2$. Incorporation of CaO and $ZrO_2$ can increase resistivity. In the ferrite sintered body, CaO and $ZrO_2$ are each preferably contained in an amount of less than 0.2% by mass relative to 100% by mass of the above components. In the case where CaO and/or $ZrO_2$ is incorporated in the ferrite sintered body, at least one oxide of Ca and/or Zr or at least one metal salt such as a carbonate or a nitrate that produces an oxide of Ca and/or Zr by firing is weighed so that the amount of Ca in terms of CaO and the amount of Zr in terms of $ZrO_2$ become 0.2% by mass or less in total, relative to total 100% by mass of the above components, and added after the calcination synthesis.

Examples of the present invention will be specifically described. However, the present invention is not limited to these Examples.

EXAMPLE 1

Ferrite sintered bodies in which the composition, the production method, etc. of a Ni—Zn ferrite were varied were prepared, and the permeability of each of the ferrite sintered bodies was measured. First, iron oxide, zinc oxide, nickel oxide, copper oxide, and silicon oxide each having an average particle diameter of 1 μm were prepared as starting materials.

On the other hand, the iron oxide, zinc oxide, nickel oxide, and copper oxide were weighed so as to have the compositions shown in Table 1, and pulverized and mixed in a ball mill. Each of the resulting mixtures was then calcined at a temperature of 700° C. or lower for two hours. Thus, synthesized calcined bodies were prepared.

Next, the iron oxide, zinc oxide, nickel oxide, copper oxide, and silicon oxide were weighed so as to have the compositions shown in Table 2, and pulverized and mixed in a ball mill. Each of the resulting mixtures was then calcined at a temperature of 700° C. or lower for two hours. Thus, synthesized calcined bodies were prepared. The silicon oxide was weighed so that the content thereof was 0.05% by mass relative to total 100% by mass of the iron oxide, zinc oxide, nickel oxide, and copper oxide.

Next, titanium oxide was weighed so as to have contents shown in Tables 1 and 2 relative to total 100% by mass of the iron oxide, zinc oxide, nickel oxide, and copper oxide. The titanium oxide was put in a ball mill together with each calcined body and mixed. A predetermined amount of a binder was then added to each of the resulting mixtures to prepare slurries. Each of the slurries was granulated using a spray granulator to prepare spherical granules. Press forming was then performed by using the spherical granules to prepare compacts having the shape of the toroidal core 1 shown in FIG. 1.

Next, the compacts were subjected to a binder-removing process in a degreasing furnace at a maximum temperature of 600° C. for five hours to prepare degreased bodies. The degreased bodies were fired in a firing furnace in an air atmosphere by being maintained at a maximum temperature of 1,100° C. for two hours. The resulting sintered bodies were then ground to obtain toroidal-shaped ferrite sintered bodies (Sample Nos. 1 to 44) having an outer diameter of 13 mm, an inner diameter of 7 mm, and a thickness of 3 mm. The temperature increasing rate in the range of 800° C. to 1,000° C. in the firing step was 600° C./h. Sample No. 1 in Table 1 and Sample No. 23 in Table 2 differ in terms of the addition or non-addition of silicon oxide to the starting materials. Sample Nos. 2 to 22 correspond to Sample Nos. 24 to 44, respectively.

A covered copper wire having a wire diameter of 0.2 mm was wound over the entire circumference of a winding portion 1a of each of the samples ten times. The permeability of each of the resulting samples at a frequency of 100 kHz was measured with an LCR meter. Tables 1 and 2 show the results. A value calculated by a formula $(\mu2-\mu1)/\mu1 \times 100$ is shown in Table 2 as a ratio of improvement in permeability where μ1 represents a permeability of a sample to which silicon oxide was not added to the starting materials and which is shown in Table 1 and μ2 represents a permeability of a sample (for example, Sample No. 23 in Table 2 when the sample in Table 1 is Sample No. 1) to which silicon oxide was added to the starting materials and which is shown in Table 2.

Measurement samples having a diameter φ of 16 mm and a thickness of 1 mm were separately prepared by the same method as the method for producing the above samples except for the shape. The resistivity of each of the measurement samples was measured with a super megohmmeter (manufactured by TOA Corporation, DSM-8103) in an environment at an application voltage of 1,000 V, at a temperature of 26° C., and at a humidity of 36% by a three-terminal method (JIS K6271; double ring electrode method).

A cut surface of each sample was mirror-finished and observed with a TEM. A spot (diameter φ: 1 nm) was directed on three positions in each of the inner region and the outer region of a crystal grain by using an EDS attached to the TEM, and the average of the amount of Ti present in each of the regions was calculated. Thus, the presence or absence of uneven distribution of Ti was examined. In the case where the difference between the average of the amount of Ti present in the outer region and the average of the amount of Ti present in the inner region was 0.5% or more, it was determined that Ti was unevenly distributed. In the case where the difference was less than 0.5%, it was determined that Ti was not unevenly distributed.

For each sample, the amounts of elemental metals of Fe, Zn, Ni, and Cu were determined by using an X-ray fluorescence spectrometer, and the contents of Fe, Zn, Ni, and Cu were respectively converted to the contents of $Fe_2O_3$, $ZnO$, $NiO$, and $CuO$. The molar values were then calculated from the corresponding molecular weights. The ratio of each of the components relative to total 100% by mole was calculated and shown in Tables 1 and 2. Similarly, regarding Si and Ti, the amounts of Si and Ti were measured by using an X-ray fluorescence spectrometer, and the contents of Si and Ti were then respectively converted to the contents of $SiO_2$ and $TiO_2$. Each of the ratios of $SiO_2$ and $TiO_2$ relative to total 100% by mass of $Fe_2O_2$, $ZnO$, $NiO$, and $CuO$ was calculated. The $SiO_2$ content of each of Sample Nos. 23 to 44 was 0.05% by mass. Tables 1 and 2 show the composition, the presence or absence of uneven distribution of Ti, and the results of the permeability and the resistivity.

TABLE 1

| Sample No. | $Fe_2O_3$ mol % | ZnO mol % | NiO mol % | CuO mol % | $TiO_2$ mass % | Presence or absence of uneven distribution of Ti | Permeability μ | Resistivity (Ω · cm) |
|---|---|---|---|---|---|---|---|---|
| 1 | 44 | 35 | 14 | 7 | 0.1 | Absent | 240 | $1.2 \times 10^9$ |
| 2 | 45 | 35 | 14 | 6 | 0.1 | Absent | 310 | $7.8 \times 10^8$ |
| 3 | 48 | 31 | 16 | 5 | 0.1 | Absent | 1310 | $3.8 \times 10^8$ |
| 4 | 50 | 29 | 14 | 7 | 0.1 | Absent | 1300 | $1.2 \times 10^8$ |
| 5 | 52 | 28 | 14 | 6 | 0.1 | Absent | 1040 | $8.5 \times 10^7$ |
| 6 | 47 | 13 | 34 | 6 | 0.1 | Absent | 110 | $5.6 \times 10^8$ |
| 7 | 47 | 14 | 33 | 6 | 0.1 | Absent | 150 | $5.5 \times 10^8$ |
| 8 | 48 | 20 | 26 | 6 | 0.1 | Absent | 190 | $4.3 \times 10^8$ |
| 9 | 45 | 36 | 14 | 5 | 0.1 | Absent | 350 | $7.9 \times 10^8$ |
| 10 | 47 | 34 | 13 | 6 | 0.1 | Absent | 610 | $5.4 \times 10^8$ |
| 11 | 48 | 26 | 20 | 6 | 0.1 | Absent | 790 | $4.4 \times 10^8$ |
| 12 | 45 | 14 | 35 | 6 | 0.1 | Absent | 150 | $7.6 \times 10^8$ |
| 13 | 45 | 14 | 36 | 5 | 0.1 | Absent | 120 | $7.6 \times 10^8$ |
| 14 | 47 | 23 | 22 | 8 | 0.1 | Absent | 420 | $5.7 \times 10^8$ |
| 15 | 48 | 14 | 35 | 3 | 0.1 | Absent | 100 | $4.2 \times 10^8$ |
| 16 | 48 | 17 | 35 | 0 | 0.1 | Absent | 170 | $4.2 \times 10^8$ |
| 17 | 49 | 31 | 14 | 6 | 0.03 | Absent | 1230 | $4.5 \times 10^8$ |
| 18 | 49 | 31 | 14 | 6 | 0.05 | Absent | 1245 | $4.3 \times 10^8$ |
| 19 | 49 | 31 | 14 | 6 | 0.08 | Absent | 1280 | $4.0 \times 10^8$ |
| 20 | 49 | 31 | 14 | 6 | 0.15 | Absent | 1320 | $2.5 \times 10^8$ |
| 21 | 49 | 31 | 14 | 6 | 0.3 | Absent | 1380 | $1.2 \times 10^8$ |
| 22 | 49 | 31 | 14 | 6 | 0.35 | Absent | 1385 | $9.5 \times 10^7$ |

TABLE 2

| Sample No. | $Fe_2O_3$ mol % | ZnO mol % | NiO mol % | CuO mol % | $SiO_2$ mass % | $TiO_2$ mass % | Presence or absence of uneven distribution of Ti | Permeability μ | Ratio of improvement in μ (%) | Resistivity (Ω · cm) |
|---|---|---|---|---|---|---|---|---|---|---|
| 23 | 44 | 35 | 14 | 7 | 0.5 | 0.1 | Present | 250 | 4.2 | $1.5 \times 10^9$ |
| 24 | 45 | 35 | 14 | 6 | 0.5 | 0.1 | Present | 324 | 4.5 | $8.2 \times 10^8$ |
| 25 | 48 | 31 | 16 | 5 | 0.5 | 0.1 | Present | 1450 | 10.7 | $4.3 \times 10^8$ |
| 26 | 50 | 29 | 14 | 7 | 0.5 | 0.1 | Present | 1435 | 10.4 | $1.6 \times 10^8$ |
| 27 | 52 | 28 | 14 | 6 | 0.5 | 0.1 | Present | 1120 | 7.7 | $9.0 \times 10^7$ |
| 28 | 47 | 13 | 34 | 6 | 0.5 | 0.1 | Present | 114 | 3.9 | $6.0 \times 10^8$ |
| 29 | 47 | 14 | 33 | 6 | 0.5 | 0.1 | Present | 156 | 4.2 | $5.8 \times 10^8$ |
| 30 | 48 | 20 | 26 | 6 | 0.5 | 0.1 | Present | 198 | 4.5 | $4.8 \times 10^8$ |
| 31 | 45 | 36 | 14 | 5 | 0.5 | 0.1 | Present | 366 | 4.7 | $8.3 \times 10^8$ |
| 32 | 47 | 34 | 13 | 6 | 0.5 | 0.1 | Present | 648 | 6.2 | $5.8 \times 10^8$ |
| 33 | 48 | 26 | 20 | 6 | 0.5 | 0.1 | Present | 852 | 7.8 | $4.8 \times 10^8$ |
| 34 | 45 | 14 | 35 | 6 | 0.5 | 0.1 | Present | 156 | 4.2 | $8.0 \times 10^8$ |
| 35 | 45 | 14 | 36 | 5 | 0.5 | 0.1 | Present | 125 | 3.9 | $8.0 \times 10^8$ |
| 36 | 47 | 23 | 22 | 8 | 0.5 | 0.1 | Present | 442 | 5.3 | $6.1 \times 10^8$ |
| 37 | 48 | 14 | 35 | 3 | 0.5 | 0.1 | Present | 104 | 3.8 | $4.6 \times 10^8$ |

TABLE 2-continued

| Sample No. | Fe$_2$O$_3$ mol % | ZnO mol % | NiO mol % | CuO mol % | SiO$_2$ mass % | TiO$_2$ mass % | Presence or absence of uneven distribution of Ti | Permeability μ | Ratio of improvement in μ (%) | Resistivity (Ω · cm) |
|---|---|---|---|---|---|---|---|---|---|---|
| 38 | 48 | 17 | 35 | 0 | 0.5 | 0.1 | Present | 177 | 4.4 | 4.6 × 10$^8$ |
| 39 | 49 | 31 | 14 | 6 | 0.5 | 0.03 | Present | 1347 | 9.5 | 5.0 × 10$^8$ |
| 40 | 49 | 31 | 14 | 6 | 0.5 | 0.05 | Present | 1370 | 10.0 | 4.8 × 10$^8$ |
| 41 | 49 | 31 | 14 | 6 | 0.5 | 0.08 | Present | 1412 | 10.3 | 4.5 × 10$^8$ |
| 42 | 49 | 31 | 14 | 6 | 0.5 | 0.15 | Present | 1462 | 10.8 | 3.0 × 10$^8$ |
| 43 | 49 | 31 | 14 | 6 | 0.5 | 0.3 | Present | 1532 | 11.0 | 1.7 × 10$^8$ |
| 44 | 49 | 31 | 14 | 6 | 0.5 | 0.35 | Present | 1485 | 7.2 | 9.9 × 10$^7$ |

Referring to Tables 1 and 2, it was found that the permeability could be increased when Ti was unevenly distributed in an outer region of a crystal grain, the outer region extending from an interface of the crystal grain of a Ni—Zn ferrite to a length of 20% of a major axis of the crystal grain. It was also found that ferrite sintered bodies each having a high resistivity and a high permeability could be obtained when the following conditions were satisfied. Specifically, the ferrite sintered bodies each contained Fe, Zn, Ni, Cu, and Ti. In addition, when the total of components of Fe, Zn, Ni, and Cu in terms of oxides thereof was assumed to be 100% by mole, a composition of each of the ferrite sintered bodies was 48% by mole or more and 50% by mole or less of Fe in terms of Fe$_2$O$_3$, 29% by mole or more and 31% by mole or less of Zn in terms of ZnO, 14% by mole or more and 16% by mole or less of Ni in terms of NiO, and 5% by mole or more and 7% by mole or less of Cu in terms of CuO. Furthermore, the ferrite sintered bodies each contained 0.05% by mass or more and 0.30% by mass or less of Ti in terms of TiO$_2$ relative to total 100% by mass of the above components.

Regarding Sample No. 39, the presence of Ti was observed also in the inner region. However, regarding Sample Nos. 23 to 38 and 40 to 44, the presence of Ti was not observed in the inner region. Accordingly, it was found that Ti could be allowed to be present only in the outer regions in crystal grains by making the amount of silicon oxide added smaller than the amount of titanium oxide added.

Furthermore, samples having the same compositions were prepared by adding silicon oxide after calcination synthesis or adding Ti to the starting materials. However, a permeability substantially the same as those of samples prepared by conducting calcination synthesis after the addition of silicon oxide to the starting materials, and adding Ti after the calcination synthesis could not be obtained.

In addition, the ferrite sintered bodies of Sample Nos. 25, 26, 34, 36, 38, 40, and 42 were used as cores, and a metal wire was wound around each of the cores to produce coil components. The coil components were used as noise filters installed in control devices of an electric car, a hybrid car, or the like, the control devices requiring complex control. According to the results, a good noise removing performance was achieved.

EXAMPLE 2

Next, samples in which the temperature increasing rate in the range of 800° C. to 1,000° C. in the firing step was varied were prepared, and the permeability of each of the samples was measured. The samples were prepared by the same method as in Example 1 except that the temperature increasing rate in the range of 800° C. to 1,000° C. was changed as shown in Table 3. Sample No. 45 is the same as Sample No. 40. The permeability was measured by the same method as in Example 1. Table 3 shows the results.

TABLE 3

| Sample No. | Fe$_2$O$_3$ mol % | ZnO mol % | NiO mol % | CuO mol % | TiO$_2$ mass % | Presence or absence of uneven distribution of Ti | Temperature increasing rate from 800° C. to 1000° C. ° C./h | Amount of Ti present mass % | Permeability μ |
|---|---|---|---|---|---|---|---|---|---|
| 45 | 49 | 31 | 14 | 6 | 0.05 | Present | 600 | 0.4 | 1370 |
| 46 | 49 | 31 | 14 | 6 | 0.05 | Present | 500 | 0.5 | 1389 |
| 47 | 49 | 31 | 14 | 6 | 0.05 | Present | 250 | 3.3 | 1400 |
| 48 | 49 | 31 | 14 | 6 | 0.05 | Present | 150 | 5.0 | 1398 |
| 49 | 49 | 31 | 14 | 6 | 0.05 | Present | 100 | 5.5 | 1375 |

Referring to Table 3, it was found that ferrite sintered bodies each having a higher permeability were obtained when the amount of Ti present in the outer region was 0.5% by mass or more and 5.0% by mass or less.

EXAMPLE 3

Next, samples were prepared in which a Ni powder was added after calcination synthesis so that the Ni content became the values shown in Table 4 in terms of NiO. The hardness and the permeability of each of the samples were measured. The samples were prepared by the same method as in the preparation of Sample No. 47 of Example 3 except that a Ni powder was added after calcination synthesis so that the Ni content became the values shown in Table 4 in terms of NiO.

The hardness was measured in accordance with JIS 1610-2003. The permeability was measured by the same method as in Example 1. Table 4 shows the results.

TABLE 4

| Sample No. | Fe$_2$O$_3$ mol % | ZnO mol % | NiO mol % | CuO mol % | TiO$_2$ mass % | Amount added after calcination mol % in terms of NiO | Area occupancy ratio % | Hardness Hv | Permeability μ |
|---|---|---|---|---|---|---|---|---|---|
| 50 | 49 | 31 | 13.9995 | 6 | 0.05 | 0.0005 | 0.04 | 755 | 1400 |
| 51 | 49 | 31 | 13.9994 | 6 | 0.05 | 0.0006 | 0.05 | 780 | 1400 |
| 52 | 49 | 31 | 13.9988 | 6 | 0.05 | 0.0012 | 0.10 | 810 | 1399 |
| 53 | 49 | 31 | 13.9973 | 6 | 0.05 | 0.0027 | 0.24 | 920 | 1402 |
| 54 | 49 | 31 | 13.994 | 6 | 0.05 | 0.006 | 0.49 | 900 | 1400 |
| 55 | 49 | 31 | 13.988 | 6 | 0.05 | 0.012 | 1.00 | 840 | 1400 |
| 56 | 49 | 31 | 13.976 | 6 | 0.05 | 0.024 | 2.00 | 790 | 1399 |
| 57 | 49 | 31 | 13.967 | 6 | 0.05 | 0.033 | 3.00 | 745 | 1395 |

Referring to Table 4, it was found that ferrite sintered bodies each having a high hardness while maintaining the permeability could be obtained when a portion having a characteristic X-ray intensity of Ni higher than that in a crystal grain of a Ni—Zn ferrite was present in a grain boundary of the crystal grain of the Ni—Zn ferrite, and the area occupancy ratio of the portion was 0.01% or more and 2.0% or less.

EXAMPLE 4

Next, samples were prepared in which manganese oxide was added after calcination synthesis so that the Mn content became the values shown in Table 5 in terms of MnO$_2$. The permeability of each of the samples was measured. The samples were prepared by the same method as in the preparation of Sample No. 47 of Example 3 except that manganese oxide was added after calcination synthesis so that the Mn content became the values shown in Table 5 in terms of MnO$_2$. The content in terms of MnO$_2$ was calculated by the same method as in Example 1. The permeability was measured by the same method as in Example 1. Table 5 shows the results.

TABLE 5

| Sample No. | Fe$_2$O$_3$ mol % | ZnO mol % | NiO mol % | CuO mol % | TiO$_2$ mass % | MnO$_2$ mass % | Permeability μ |
|---|---|---|---|---|---|---|---|
| 58 | 49 | 31 | 14 | 6 | 0.05 | 0 | 1400 |
| 59 | 49 | 31 | 14 | 6 | 0.05 | 0.04 | 1407 |
| 60 | 49 | 31 | 14 | 6 | 0.05 | 0.05 | 1415 |
| 61 | 49 | 31 | 14 | 6 | 0.05 | 0.1 | 1425 |
| 62 | 49 | 31 | 14 | 6 | 0.05 | 0.25 | 1442 |
| 63 | 49 | 31 | 14 | 6 | 0.05 | 0.4 | 1432 |
| 64 | 49 | 31 | 14 | 6 | 0.05 | 0.5 | 1426 |
| 65 | 49 | 31 | 14 | 6 | 0.05 | 0.55 | 1410 |

Referring to Table 5, it was found that ferrite sintered bodies each having a higher permeability were obtained when the ferrite sintered bodies contained Mn, and the Mn content was 0.05% by mass or more and 0.5% by mass or less in terms of MnO$_2$ relative to total 100% by mass of components of Fe, Zn, Ni, and Cu in terms of oxides thereof.

EXAMPLE 5

Next, samples were prepared in which molybdenum oxide and/or tungsten oxide was added after calcination synthesis so that the Mo content became the values shown in Table 6 in terms of MoO$_3$ and the W content became the values shown in Table 6 in terms of WO$_3$. The permeability of each of the samples was measured. The samples were prepared by the same method as in the preparation of Sample No. 62 of Example 4 except that molybdenum oxide and/or tungsten oxide was added after calcination synthesis so that the Mo content became the values shown in Table 6 in terms of MoO$_3$ and the W content became the values shown in Table 6 in terms of WO$_3$. The content in terms of MoO$_3$ and the content in terms of WO$_3$ were calculated by the same method as in Example 1. The permeability was measured by the same method as in Example 1. Table 6 shows the results.

TABLE 6

| Sample No. | Fe$_2$O$_3$ mol % | ZnO mol % | NiO mol % | CuO mol % | TiO$_2$ mass % | MnO$_2$ mass % | MoO$_3$ mass % | WO$_3$ mass % | Permeability μ |
|---|---|---|---|---|---|---|---|---|---|
| 66 | 49 | 31 | 14 | 6 | 0.05 | 0.25 | 0 | 0 | 1442 |
| 67 | 49 | 31 | 14 | 6 | 0.05 | 0.25 | 0.007 | 0 | 1449 |
| 68 | 49 | 31 | 14 | 6 | 0.05 | 0.25 | 0.01 | 0 | 1470 |
| 69 | 49 | 31 | 14 | 6 | 0.05 | 0.25 | 0.05 | 0 | 1500 |
| 70 | 49 | 31 | 14 | 6 | 0.05 | 0.25 | 0.1 | 0 | 1497 |
| 71 | 49 | 31 | 14 | 6 | 0.05 | 0.25 | 0.15 | 0 | 1475 |
| 72 | 49 | 31 | 14 | 6 | 0.05 | 0.25 | 0.16 | 0 | 1448 |
| 73 | 49 | 31 | 14 | 6 | 0.05 | 0.25 | 0 | 0.007 | 1446 |
| 74 | 49 | 31 | 14 | 6 | 0.05 | 0.25 | 0 | 0.01 | 1472 |
| 75 | 49 | 31 | 14 | 6 | 0.05 | 0.25 | 0 | 0.05 | 1497 |
| 76 | 49 | 31 | 14 | 6 | 0.05 | 0.25 | 0 | 0.1 | 1490 |
| 77 | 49 | 31 | 14 | 6 | 0.05 | 0.25 | 0 | 0.15 | 1481 |
| 78 | 49 | 31 | 14 | 6 | 0.05 | 0.25 | 0 | 0.16 | 1444 |
| 79 | 49 | 31 | 14 | 6 | 0.05 | 0.25 | 0.05 | 0.05 | 1501 |

Referring to Table 6, it was found that ferrite sintered bodies each having a higher permeability were obtained when the sintered bodies contained at least one of Mo and W, and the Mo content and the W content were respectively 0.01% by mass or more and 0.15% by mass or less in terms of $MoO_3$ and 0.01% by mass or more and 0.15% by mass or less in terms of $WO_3$ relative to total 100% by mass of components of Fe, Zn, Ni, and Cu in terms of oxides thereof.

REFERENCE SIGNS LIST

1: toroidal core
1a: winding portion
2: bobbin core
2a: winding portion

The invention claimed is:

1. A ferrite sintered body comprising a crystal grain of a Ni—Zn ferrite and a grain boundary thereof, wherein the ferrite contains silicon, and Ti is unevenly distributed in an outer region of the crystal grain, the outer region extending from an interface of the crystal grain to a length of 20% of a major axis of the crystal grain.

2. The ferrite sintered body according to claim 1, wherein the ferrite sintered body contains Fe, Zn, Ni, Cu, and Ti, when the total of components of Fe, Zn, Ni, and Cu in terms of oxides thereof is assumed to be 100% by mole, a composition of the ferrite sintered body is 48% by mole or more and 50% by mole or less of Fe in terms of $Fe_2O_3$, 29% by mole or more and 31% by mole or less of Zn in terms of ZnO, 14% by mole or more and 16% by mole or less of Ni in terms of NiO, and 5% by mole or more and 7% by mole or less of Cu in terms of CuO, and the ferrite sintered body contains 0.05% by mass or more and 0.30% by mass or less of Ti in terms of $TiO_2$ relative to total 100% by mass of the components.

3. The ferrite sintered body according to claim 1, wherein an amount of Ti present in the outer region is 0.5% by mass or more and 5.0% by mass or less.

4. The ferrite sintered body according to claim 3, wherein a portion having a characteristic X-ray intensity of Ni higher than that in the crystal grain is present in the grain boundary, and an area occupancy ratio of the portion is 0.01% or more and 2.0% or less.

5. The ferrite sintered body according to claim 2, wherein the ferrite sintered body contains Mn, and a Mn content is 0.05% by mass or more and 0.5% by mass or less in terms of $MnO_2$ relative to total 100% by mass of the components.

6. The ferrite sintered body according to claim 2, wherein the ferrite sintered body contains at least one of Mo and W, and a Mo content and a W content are respectively 0.01% by mass or more and 0.15% by mass or less in terms of $MoO_3$ and 0.01% by mass or more and 0.15% by mass or less in terms of $WO_3$ relative to total 100% by mass of the components.

7. A ferrite core comprising the ferrite sintered body according to claim 1.

8. A coil component produced by winding a metal wire around a ferrite core comprising the ferrite sintered body according to claim 2.

9. The coil component according to claim 8, used in a noise filter.

* * * * *